(12) United States Patent
Baker et al.

(10) Patent No.: US 7,969,348 B2
(45) Date of Patent: Jun. 28, 2011

(54) SYSTEMS AND METHODS FOR OBTAINING AND USING DATA FROM A LOCALIZED LOCATION AND TELEMETRY SYSTEM IN A WIDE AREA LOCATION AND TELEMETRY SYSTEM

(75) Inventors: James R. Baker, Leesburg, VA (US); Sy Prestwich, Riverton, UT (US); Scott Bevan, Lehi, UT (US)

(73) Assignee: Recon Dynamics, LLC, Kirkland, WA (US)

( * ) Notice: Subject to any disclaimer, the term of this patent is extended or adjusted under 35 U.S.C. 154(b) by 181 days.

(21) Appl. No.: 11/934,629

(22) Filed: Nov. 2, 2007

(65) Prior Publication Data

US 2009/0115608 A1 May 7, 2009

(51) Int. Cl.
*G01S 13/74* (2006.01)
*G01S 13/75* (2006.01)
(52) U.S. Cl. ............... 342/50; 342/125; 340/870.01
(58) Field of Classification Search ............ 342/50
See application file for complete search history.

(56) References Cited

U.S. PATENT DOCUMENTS

| | | | | | |
|---|---|---|---|---|---|
| 5,742,237 | A | * | 4/1998 | Bledsoe | 340/825.49 |
| 5,774,876 | A | * | 6/1998 | Woolley et al. | 705/28 |
| 5,940,006 | A | * | 8/1999 | MacLellan et al. | 340/10.1 |
| 6,480,108 | B2 | * | 11/2002 | McDonald | 340/505 |
| 6,486,794 | B1 | * | 11/2002 | Calistro et al. | 340/825.49 |
| 6,552,661 | B1 | * | 4/2003 | Lastinger et al. | 340/572.1 |
| 6,717,516 | B2 | * | 4/2004 | Bridgelall | 340/572.1 |
| 6,972,682 | B2 | * | 12/2005 | Lareau et al. | 340/568.1 |
| 6,985,087 | B2 | * | 1/2006 | Soliman | 340/870.02 |
| 7,019,663 | B2 | * | 3/2006 | Sharony | 340/825.49 |
| 7,030,761 | B2 | * | 4/2006 | Bridgelall et al. | 340/572.2 |
| 7,323,981 | B2 | * | 1/2008 | Peel et al. | 340/539.13 |
| 2003/0016142 | A1 | | 1/2003 | Holmes et al. | |
| 2004/0090950 | A1 | | 5/2004 | Lauber et al. | |
| 2005/0030015 | A1 | | 2/2005 | Duncan et al. | |
| 2005/0172024 | A1 | | 8/2005 | Cheifot et al. | |
| 2006/0071790 | A1 | * | 4/2006 | Duron et al. | 340/572.1 |
| 2006/0125631 | A1 | * | 6/2006 | Sharony | 340/539.13 |
| 2006/0268961 | A1 | | 11/2006 | Prestwich et al. | |
| 2006/0289647 | A1 | * | 12/2006 | Shafer | 235/451 |
| 2007/0296581 | A1 | * | 12/2007 | Schnee et al. | 340/572.1 |
| 2008/0111692 | A1 | * | 5/2008 | Twitchell | 340/572.1 |
| 2008/0130604 | A1 | * | 6/2008 | Boyd | 370/338 |
| 2008/0254777 | A1 | * | 10/2008 | Arneson et al. | 455/414.2 |

OTHER PUBLICATIONS

International Preliminary Report on Patentability issued for International Patent Application No. PCT/US2008/081611 on May 14, 2010.

* cited by examiner

*Primary Examiner* — Thomas H Tarcza
*Assistant Examiner* — Matthew M Barker
(74) *Attorney, Agent, or Firm* — Austin Rapp & Hardman (57) ABSTRACT

A wide area location and telemetry system may include a wide area location and telemetry system server that is configured to determine wide area location and telemetry system data about an object when the object is located within the coverage area of the wide area location and telemetry system. The wide area location and telemetry system server may also be configured to receive localized location and telemetry system data about the object when the object is located within the coverage area of a localized location and telemetry system. The wide area location and telemetry system may also include a database and a database manager. The database manager may be configured to store the wide area location and telemetry system data and the localized location and telemetry system data in the database.

10 Claims, 8 Drawing Sheets

SYSTEMS AND METHODS FOR OBTAINING AND USING DATA FROM A LOCALIZED LOCATION AND TELEMETRY SYSTEM IN A WIDE AREA LOCATION AND TELEMETRY SYSTEM

TECHNICAL FIELD

The present disclosure relates generally to systems that determine data about objects. More specifically, the present disclosure relates to location and telemetry systems.

BACKGROUND

The term "telemetry" refers to the science or activity of gathering data about remote objects and transmitting the data electronically. Systems that gather and report information about an object including the location of the object, may be referred to as location and telemetry systems.

Location and telemetry systems may gather location data and/or telemetry data. As used herein, the term "location data" refers to information related to the location of an object. The term "telemetry data" refers to any other type of data that may be determined about an object.

There are many applications for location and telemetry systems. For example, the government may wish to know the location of a shipping container for security reasons. As another example, a company may wish to know where company vehicles or personnel are currently located. As another example, someone operating a large warehouse may benefit from knowing where a particular item is located in the warehouse. As yet another example, a construction company working on a large-scale, multi-acre construction site may want to know the location and/or status of its construction equipment (or other equipment) on the site. There are many other examples of applications for location and telemetry systems.

Location and telemetry systems typically utilize wireless communications. Some location and telemetry systems utilize short-range wireless technologies, such as Ultra-Wideband (UWB), ZigBee, mesh networking, active radio frequency identification (RFID), etc. Other location and telemetry systems may use passive technologies where the tag device is activated and read by a local reader. These types of location and telemetry systems may be referred to herein as localized location and telemetry systems (LLTS).

For some applications, the devices to be monitored by a location and telemetry system may be too widely dispersed or far away from an infrastructure to utilize short-range LLTS technologies. The assignee of the present disclosure has developed a location and telemetry system that permits devices to be monitored over a much wider area than the localized systems referred to above. This type of location and telemetry system may be referred to herein as a wide area location and telemetry system (WALTS). Although a WALTS may permit devices to be monitored over a much wider area than an LLTS, an LLTS may be capable of providing more accurate information than a WALTS under some circumstances.

The present disclosure relates generally to localized location and telemetry systems and wide area location and telemetry systems. More specifically, the present disclosure relates to systems and methods for obtaining and using data from a localized location and telemetry system in a wide area location and telemetry system.

BRIEF DESCRIPTION OF THE DRAWINGS

Exemplary embodiments will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

A multi-mode tag is described that includes a localized location and telemetry system component and a wide area location and telemetry system component. The localized location and telemetry system component allows the localized location and telemetry system to determine localized location and telemetry system data about an object when the object is located within the coverage area of the localized location and telemetry system. The wide area location and telemetry system component allows the wide area location and telemetry system to determine wide area location and telemetry system data about the object when the object is located within the coverage area of the wide area location and telemetry system. In one configuration, the multi-mode tag may be configured to be coupled to the object.

The localized location and telemetry system data may include both location data and telemetry data about the object. Additionally, the wide area location and telemetry system data may include both location data and telemetry data about the object.

Communication between the localized location and telemetry system component and the localized location and telemetry system may occur in accordance with any number of protocols including, but not limited to, active radio frequency identification, passive radio frequency identification, Ultra-Wideband, ZigBee, Ultrasonic, and mesh networking.

The wide area location and telemetry system component may be configured to transmit a wide area location and telemetry system packet that is received by one or more base stations of the wide area location and telemetry system. Transmission of the wide area location and telemetry system packet may facilitate determination of location data about the object by the wide area location and telemetry system server. The wide area location and telemetry system packet may include telemetry data about the object that is determined by the wide area location and telemetry system component. Furthermore, the wide area location and telemetry system packet may include localized location and telemetry system data that is received from the localized location and telemetry system. In addition, the wide area location and telemetry system packet may include an indication about whether the localized location and telemetry system component is connected to the localized location and telemetry system.

A wide area location and telemetry system may include a wide area location and telemetry system server that is configured to determine wide area location and telemetry system data about an object when the object is located within the coverage area of the wide area location and telemetry system. The wide area location and telemetry system server may also be configured to receive localized location and telemetry system data about the object when the object is located within the coverage area of a localized location and telemetry system. The wide area location and telemetry system may also include a database and a database manager. The database manager may be configured to store the wide area location and telemetry system data and the localized location and telemetry system data in the database.

In one configuration, the database manager may be configured to associate the wide area location and telemetry system data with the wide area location and telemetry system in the database. The database manager may also be configured to associate the localized location and telemetry system data with the localized location and telemetry system in the database.

The wide area location and telemetry system may include a plurality of base stations. The plurality of base stations may be in electronic communication with the wide area location and telemetry system server via one or more Internet protocol networks. The wide area location and telemetry system server may be configured to determine location data about the object based on timing information that is provided by at least one of the plurality of base stations. The timing information that is provided by a base station may include a timestamp which indicates when a wide area location and telemetry system packet was received by the base station.

A tag that is configured to provide gateway functionality that allows objects to communicate with a wide area location and telemetry system is also described. The tag includes a communication interface that is configured to receive localized location and telemetry system data about a first object from a localized location and telemetry system. The tag also includes a wide area location and telemetry system component that is configured to transmit the localized location and telemetry system data to a wide area location and telemetry system. In one configuration, the first object may be unable to communicate directly with the wide area location and telemetry system.

In another configuration, the wide area location and telemetry system component may be configured to transmit a wide area location and telemetry system packet that is received by one or more base stations. The localized location and telemetry system data may be transmitted in the wide area location and telemetry system packet. The wide area location and telemetry system packet may be transmitted in a burst direct sequence spread spectrum radio signal.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments of the disclosed invention(s)," unless expressly specified otherwise.

The term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The present disclosure is related to U.S. patent application Ser. No. 11/140,081 (hereinafter, "the '081 application"). The '081 application was filed May 27, 2005, is titled "Burst Spread Spectrum Radio System And Method For Asset Tracking And Data Telemetry," has Sy Prestwich, Scott Bevan, Dirk Ostermiller and K. Deric Eldredge as inventors, and is assigned to the assignee of the present disclosure. The '081 application is hereby incorporated by reference in its entirety.

One aspect of the present disclosure relates to providing data that is determined by a localized location and telemetry system (LLTS) to a wide area location and telemetry system (WALTS). FIGS. 1 through 4 illustrate an embodiment of a system 100 for providing LLTS data to a WALTS.

Figure 1:
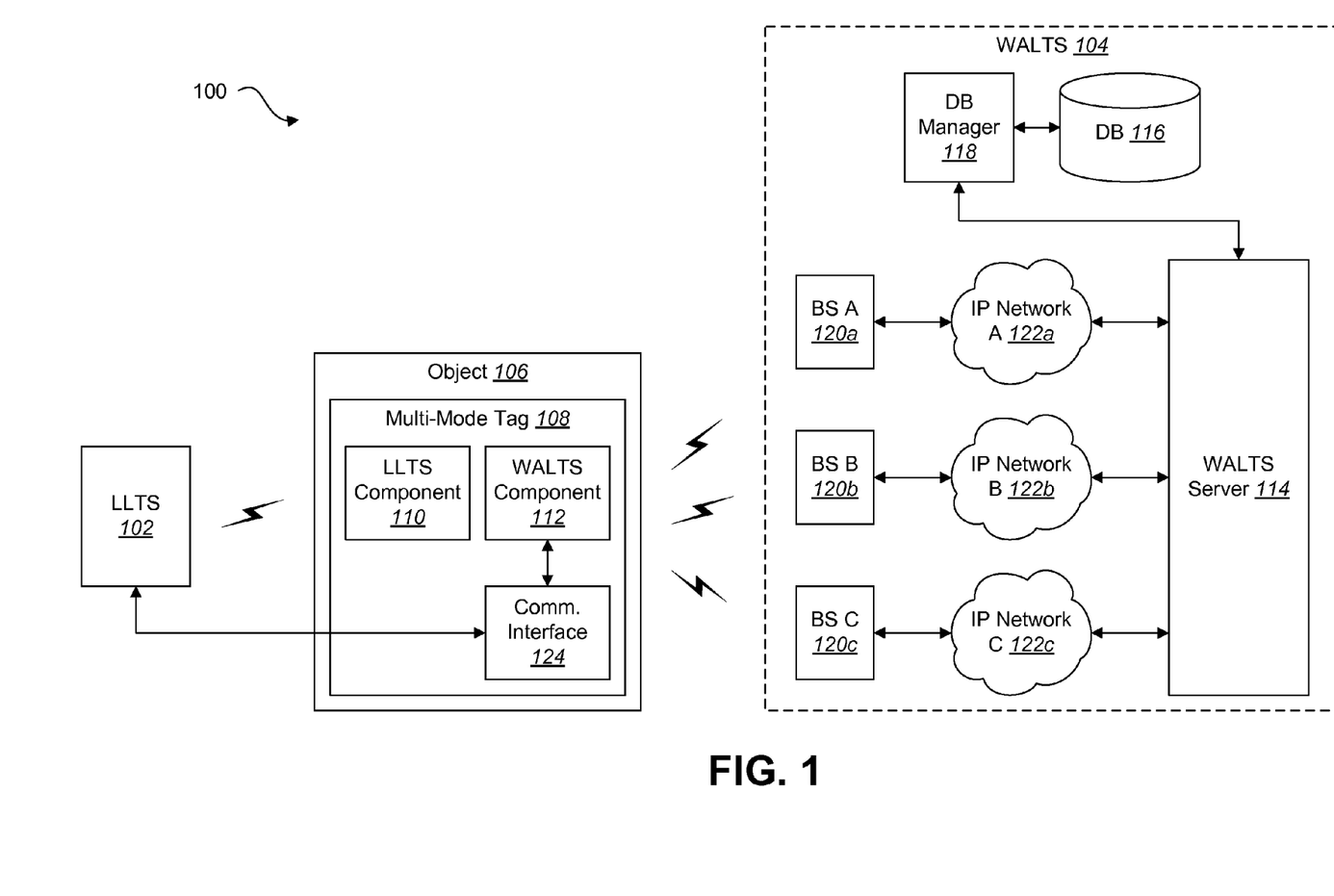
FIG. 1 illustrates an embodiment of a system for providing data that is determined by a localized location and telemetry system (LLTS) to a wide area location and telemetry system (WALTS)

Referring initially to FIG. 1, a single object 106 is shown. A multi-mode tag 108 is coupled to the object 106. The multi-mode tag 108 may be connected to the object 106 in such a way that when the object 106 is moved, the multi-mode tag 108 moves along with the object 106. The object 106 may be any kind of item including, but not limited to, a device, a person, an animal, any animate object, a structure, any inanimate object, a piece of equipment, inventory, an asset, etc.

The multi-mode tag 108 includes an LLTS component 110 that allows the LLTS 102 to determine data about the object 106 when the object 106 is located within a certain geographical area, which will be referred to as the coverage area of the LLTS 102. The data that is determined by the LLTS 102 will be referred to herein as LLTS data. The LLTS data that is determined by the LLTS 102 may include location data, telemetry data, or both location and telemetry data about the object 106.

There are many different protocols that may be used to facilitate communication between the LLTS component 110 and the LLTS 102. Some examples include active radio frequency identification, passive radio frequency identification, Ultra-Wideband, ZigBee, mesh networking, and so forth. As a specific example, the LLTS component 110 may be an RFID tag (either active or passive), and the LLTS 102 may include an RFID tag reader that reads the RFID tag.

The multi-mode tag 108 also includes a WALTS component 112 that allows the WALTS 104 to determine data about the object 106 when the object 106 is located within the coverage area of the WALTS 104. The data that is determined by the WALTS 104 will be referred to herein as WALTS data. The WALTS data that is determined by the WALTS 104 may include location data, telemetry data, or both location and telemetry data about the object 106.

The WALTS 104 includes a WALTS server 114. The WALTS server 114 is configured to determine data about the object 106 when the object 106 is located within the coverage area of the WALTS 104. As indicated above, this data will be referred to herein as WALTS data. The WALTS server 114 is also configured to receive data about the object 106 that is determined by the LLTS 102 when the object 106 is located within the coverage area of the LLTS 102. As indicated above, this data will be referred to herein as LLTS data.

The WALTS 104 also includes a database 116 and a database manager 118. The database manager 118 may be configured to store WALTS data and LLTS data in the database 116.

In the depicted embodiment, the WALTS 104 includes a number of components that allow the WALTS 104 to determine WALTS data and to receive LLTS data from the LLTS 102. In particular, the WALTS 104 includes a plurality of base stations 120. Three base stations 120 are shown in FIG. 1, namely base station A 120a, base station B 120b, and base station C 120c. Each base station 120 is in electronic communication with the WALTS server 114 via an Internet protocol (IP) network 122. In particular, base station A 120a is shown in electronic communication with the WALTS server 114 via IP network A 122a, base station B 120b is shown in electronic communication with the WALTS server 114 via IP network B 122b, and base station C 120c is shown in electronic communication with the WALTS server 114 via IP network C 122c.

In the depicted embodiment, the multi-mode tag 108 is also shown with a communication interface 124. The communication interface 124 allows the multi-mode tag 108 to receive information (such as LLTS data) from the LLTS 102, as will be described in greater detail below.

Figure 2:
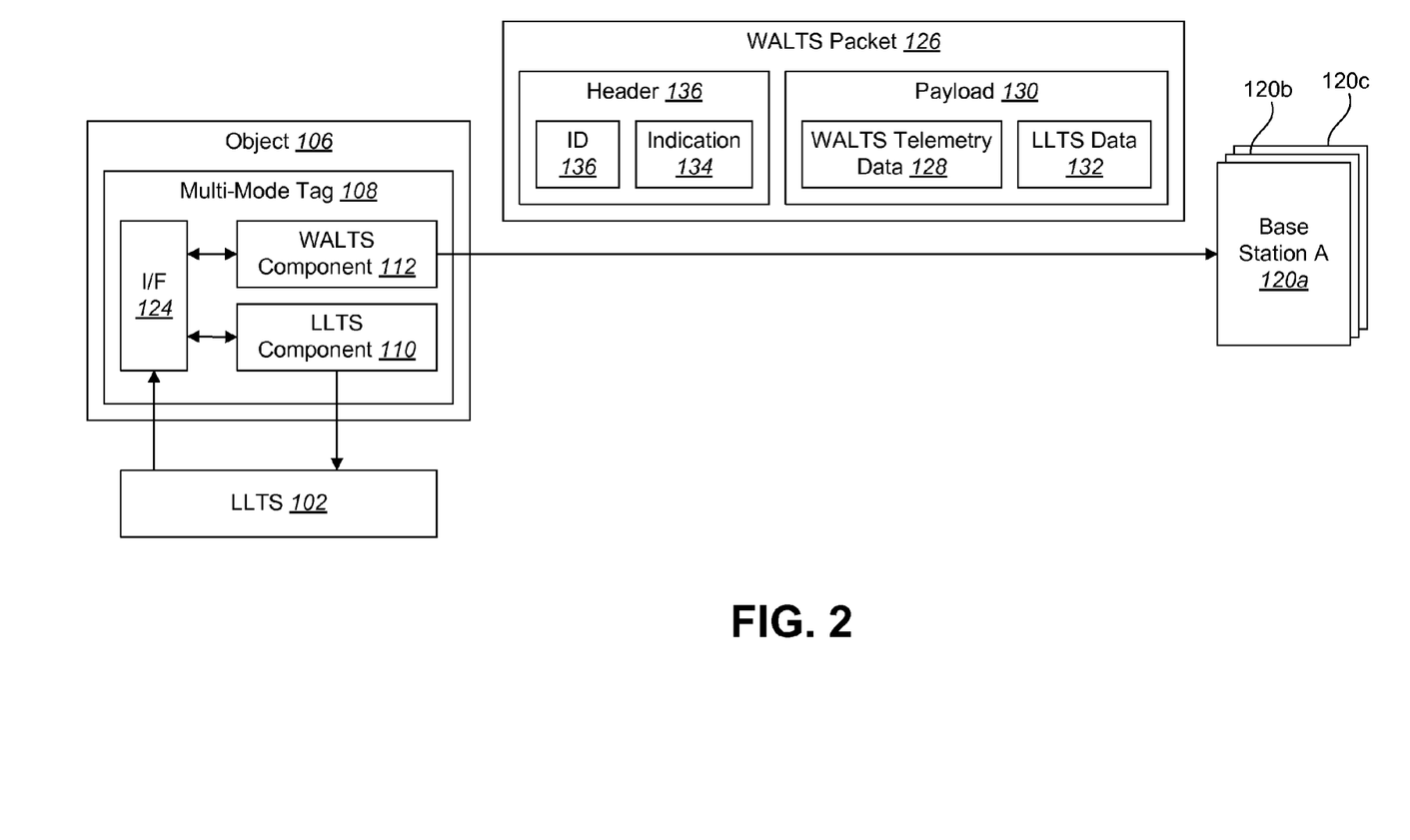
FIG. 2 illustrates how various components in the system of FIG. 1 may be configured to operate under some circumstances.

Referring now to FIG. 2, the WALTS component 112 may be configured to transmit a WALTS packet 126 that is received by one or more base stations 120 of the WALTS 104. FIG. 2 shows the WALTS packet 126 being received by base station A 120a, base station B 120b, and base station C 120c of the WALTS 104.

The transmission of the WALTS packet 126 may accomplish several things. For example, the transmission of the WALTS packet 126 may allow the WALTS server 114 to determine location data about the object 106. This will be described in greater detail below.

In addition, the transmission of the WALTS packet 126 may provide a way for WALTS telemetry data 128 to be communicated to the WALTS 104 and stored in the WALTS database 116. The WALTS telemetry data 128 is telemetry data about the object 106 that is determined by the WALTS component 112 of the multi-mode tag 108. The WALTS telemetry data 128 may be included in a payload portion 130 of the WALTS packet 126, as shown in FIG. 2.

The transmission of the WALTS packet 126 may also provide a way for LLTS data 132 to be communicated to the WALTS 104 and stored in the WALTS database 116. In the depicted embodiment, the LLTS 102 does not communicate directly with the WALTS 104. Instead, the LLTS 102 transmits the LLTS data 132 back to the multi-mode tag 108 so that the multi-mode tag 108 may transmit the LLTS data 132 to the WALTS 104. The LLTS 102 may transmit the LLTS data 132 to the multi-mode tag 108 via the communication interface 124, as shown in FIG. 2. The LLTS data 132 may then be included in the payload 130 of the WALTS packet 126, as shown in FIG. 2.

In an alternative embodiment, the LLTS 102 may communicate directly with the WALTS 104. Thus, the LLTS data 132 may be transmitted directly from the LLTS 102 to the WALTS 104 (e.g., via an IP network). This will be described in greater detail below.

The WALTS component 112 may be configured to transmit a new WALTS packet 126 each time that a predetermined event occurs. For example, a new WALTS packet 126 may be transmitted on a periodic basis. As another example, a new WALTS packet 126 may be transmitted each time that there is new data (e.g., new WALTS telemetry data 128 and/or new LLTS data 132) to transmit.

The WALTS packets 126 that are transmitted by the WALTS component 112 may be transmitted in burst direct sequence spread spectrum radio signals. Additional information about the burst direct sequence spread spectrum radio signals is provided in the '081 application referred to above.

As shown, the WALTS packet 126 may include an indication 134 about whether the LLTS component 110 of the multi-mode tag 108 is connected to the LLTS 102. This indication 134 may be referred to herein as an LLTS connectivity indication 134. Other components in the system 100 that receive the WALTS packet 126 (e.g., the WALTS server 114, the database manager 118, etc.) may use the LLTS connectivity indication 134 to determine whether LLTS data 132 is included in the WALTS packet 126. The LLTS connectivity indication 134 may be included in a header portion 136 of the WALTS packet 126, as shown in FIG. 2.

The LLTS connectivity indication 134 may be included in the WALTS packet 126 if the LLTS component 110 of the multi-mode tag 108 has the capability to determine whether or not it is connected to the LLTS 102. However, some types of LLTS components 110 that may be used may not have this functionality (e.g., passive RFID tags).

The WALTS packet 126 may also include a device identifier (ID) 136. The device ID 136 may be included in the header 136 of the WALTS packet 126, as shown. The device ID 136 may be used to associate the WALTS telemetry data 128 (as well as other WALTS data) and the LLTS data 132 with the object 106 in the database 116, as will be described in greater detail below.

Figure 3:
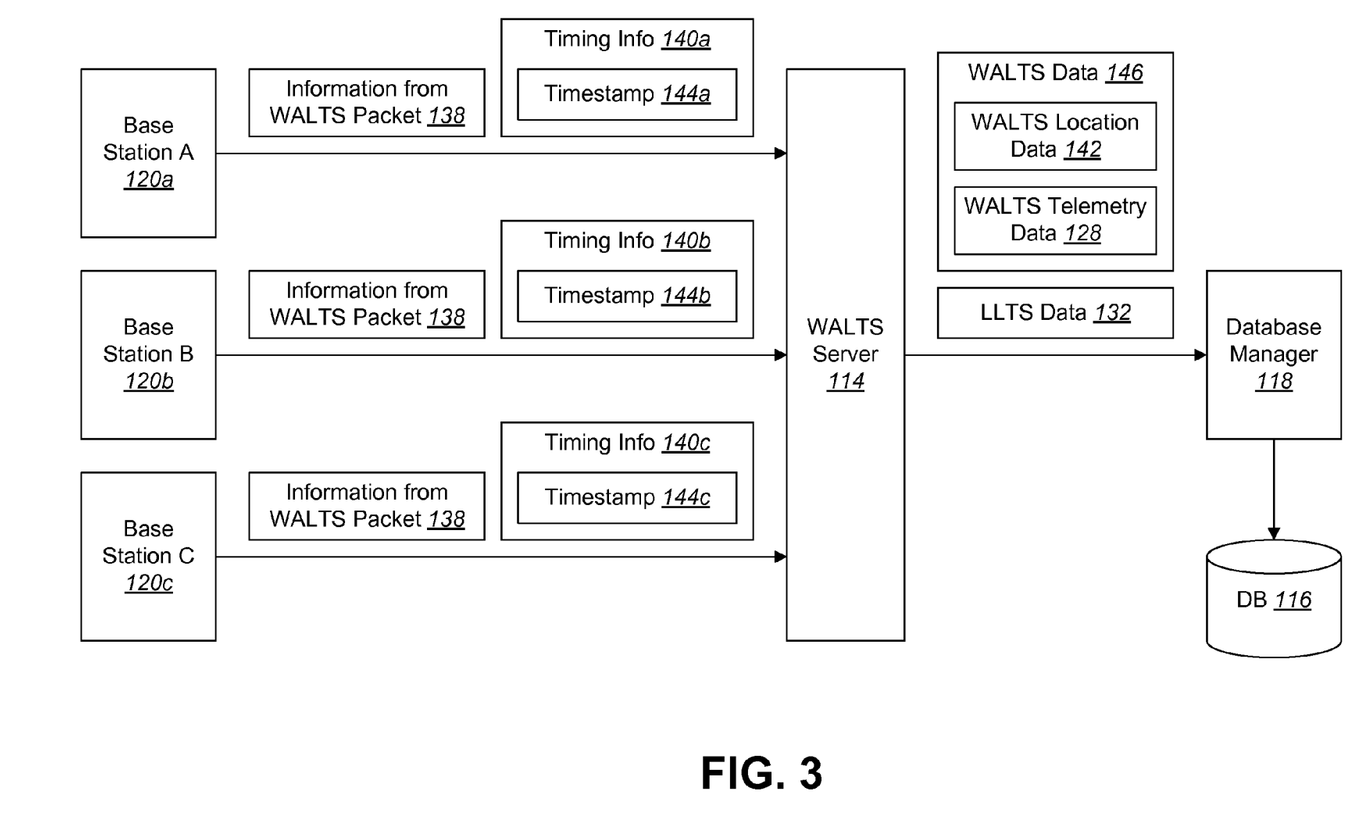
FIG. 3 illustrates how various components in the system of FIG. 1 may be configured to operate under some circumstances.

Referring now to FIG. 3, each base station 120 that receives the WALTS packet 126 may forward the information 138 that is included within the WALTS packet 126 to the WALTS server 114. For example, each base station 120 may forward the WALTS telemetry data 128, the LLTS data 132, the LLTS connectivity indication 134, and the device ID 136 to the WALTS server 114.

In addition, each base station 120 may forward timing information 140 to the WALTS server 114. The WALTS server 114 may use the timing information 140 that it receives to determine location data 142 about the object 106. This location data 142 will be referred to herein as WALTS location data 142.

The timing information 140 that is provided by a particular base station 120 may include a timestamp 144 which indicates when the WALTS packet 126 was received by the base station 120. FIG. 3 shows the timing information 140a that is provided by base station A 120a including timestamp A 144a, the timing information 140b that is provided by base station B 120b including timestamp B 144b, and the timing information 140c that is provided by base station C 120c including timestamp C 144c. Timestamp A 144a indicates when the WALTS packet 126 was received by base station A 120a, timestamp B 144b indicates when the WALTS packet 126 was received by base station B 120b, and timestamp C 144c indicates when the WALTS packet 126 was received by base station C 120c. Additional information about how the WALTS server 114 may use the timestamps 144 to determine the WALTS location data 142 is provided in the '081 application referred to above.

FIG. 3 shows the WALTS server 114 receiving timing information 140 from multiple base stations 120. In particular, FIG. 3 shows the WALTS server 114 receiving timing information 140a from base station A 120a, timing information 140b from base station B 120b, and timing information 140c from base station C 120c. Alternatively, under some circumstances the WALTS server 114 may only receive timing information 140 from a single base station 120. This may be the case, for example, when the object 106 is positioned so that it is only able to communicate with a single base station 120.

Once the WALTS server 114 has determined the WALTS location data 142 based on the timing information 140 that it receives, the WALTS server 114 may forward the WALTS location data 142 to the database manager 118. The WALTS server 114 may also forward the WALTS telemetry data 128 to the database manager 118. The WALTS location data 142 and the WALTS telemetry data 128 may be referred to collectively as WALTS data 146. The WALTS server 114 may also forward the LLTS data 132 to the database manager 118. The database manager 118 may store the WALTS data 146 and the LLTS data 132 in the WALTS database 116.

As indicated above, the LLTS 102 may determine data about the object 106 (i.e., LLTS data 132) when the object 106 is located within the coverage area of the LLTS 102. However, the object 106 may not always be located within the coverage area of the LLTS 102, and thus the LLTS data 132 may not always be available. Systems that utilize the data in the database 116 may utilize the LLTS data 132 when it is available. The LLTS data 132 may be preferable to the WALTS data 146 because the LLTS 102 may be capable of providing more accurate information than the WALTS 104. However, when the LLTS data 132 is not available, such systems may use the WALTS data 146 instead. Of course, under some circumstances both the LLTS data 132 and the WALTS data 146 may be utilized when both are available.

Figure 4:
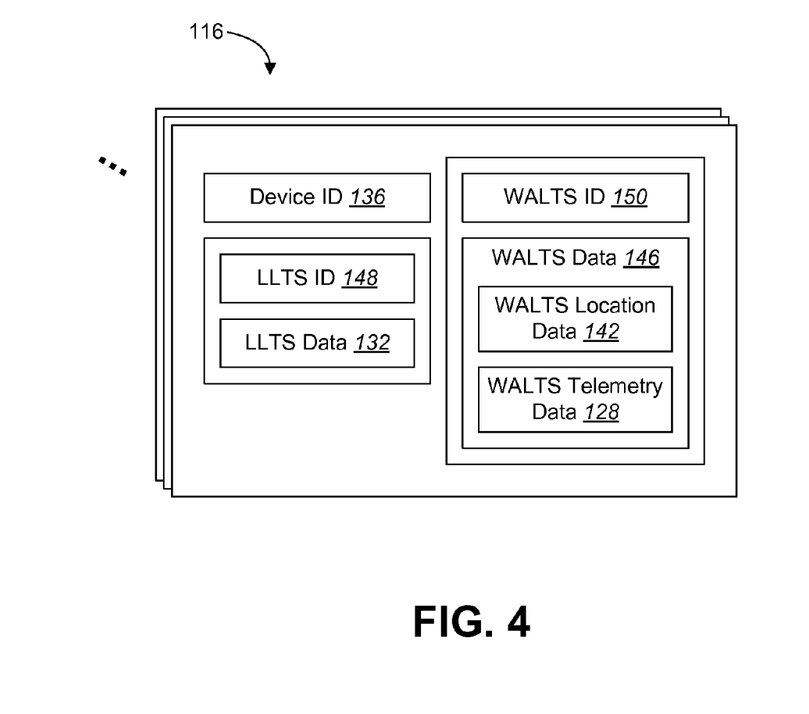
FIG. 4 illustrates how some of the information that is utilized in the system of FIG. 1 may be stored in a database.

FIG. 4 illustrates an example showing how the WALTS data 146 and the LLTS data 132 may be stored in the WALTS database 116. In the depicted example, the LLTS data 132 is associated with the LLTS 102, and the WALTS data 146 (which includes the WALTS location data 142 and the WALTS telemetry data 128) is associated with the WALTS 104.

In the depicted example, the WALTS database 116 includes an identifier 148 that identifies the LLTS 102. This identifier 148 may be referred to herein as an LLTS ID 148. The LLTS ID 148 may uniquely identify the LLTS 102. The WALTS database 116 may be configured so that the LLTS data 132 is associated with the LLTS ID 148, as shown in FIG. 4.

The WALTS database 116 also includes an identifier 150 that identifies the WALTS 104. This identifier 150 may be referred to herein as a WALTS ID 150. The WALTS ID 150 may uniquely identify the WALTS 104. The WALTS database 116 may be configured so that the WALTS data 146 is associated with the WALTS ID 150, as shown in FIG. 4.

Figure 5:
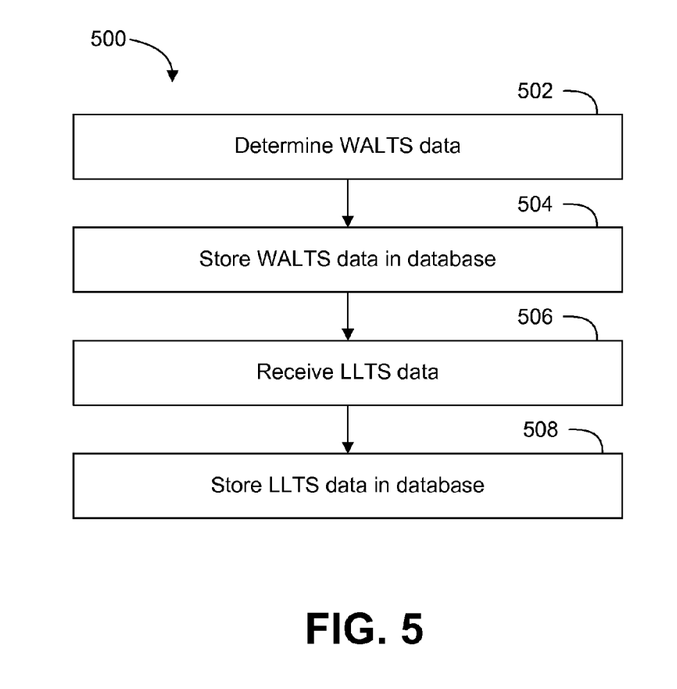
FIG. 5 illustrates an embodiment of a method for utilizing data that is determined by an LLTS in a WALTS.

FIG. 5 illustrates an embodiment of a method 500 for utilizing data that is determined by an LLTS 102 in a WALTS 104. The method 500 that is shown in FIG. 5 may be implemented by the WALTS 104 in the system 100 of FIGS. 1 through 4.

The method 500 may involve determining 502 WALTS data 146. As indicated above, the WALTS data 146 is data about an object 106 that is determined by the WALTS 104. The WALTS data 146 may include location data 142 about the object 106, telemetry data 128 about the object 106, or both location data 142 about the object 106 and telemetry data 128 about the object 106. As discussed above, a multi-mode tag 108 may be coupled to the object 106, and a WALTS component 112 in the multi-mode tag 108 may transmit a WALTS packet 126 that is received by one or more base stations 120. The location data 142 about the object 106 may be determined based on timing information 140 that is provided by the base stations 120. The telemetry data 128 may be determined by the WALTS component 112 and included in the WALTS packet 126. The method 500 may also involve storing 504 the WALTS data 146 in a database 116.

The method 500 may also involve receiving 506 LLTS data 132 from an LLTS 102. As indicated above, the LLTS data 132 is data about an object 106 that is determined by the LLTS 102. The LLTS data 132 may include location data about the object 106, telemetry data about the object 106, or both location data about the object 106 and telemetry data about the object 106. As discussed above, the LLTS data 132 may be included in a WALTS packet 126 that is transmitted by the WALTS component 112. The method 500 may also involve storing 508 the LLTS data 132 in a database 116.

Figure 6:
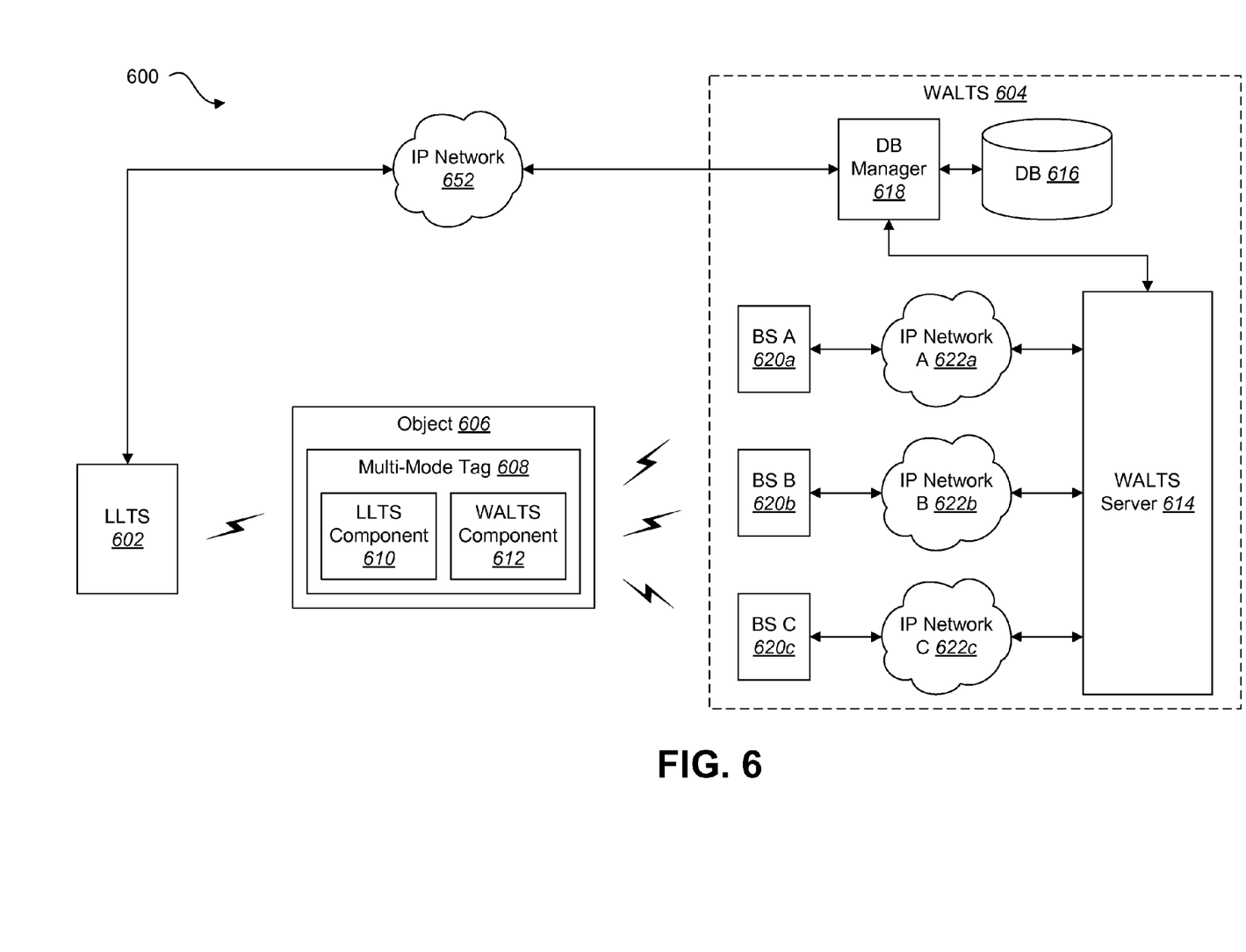
FIG. 6 illustrates another embodiment of a system for providing data that is determined by an LLTS to a WALTS.

FIG. 6 illustrates another embodiment of a system 600 for providing data that is determined by an LLTS 602 to a WALTS 604. The system 600 that is shown in FIG. 6 is similar in many respects to the system 100 that is shown in FIG. 1. A single object 606 is shown. A multi-mode tag 608 is coupled to the object 606. The multi-mode tag 608 includes an LLTS component 610 and a WALTS component 612. The WALTS 604 includes a WALTS server 614, a database 616, and a database manager 618. The WALTS 604 also includes a plurality of base stations 620. Base station A 620a, base station B 620b, and base station C 620c are shown in FIG. 6. Each base station 620 is in electronic communication with the WALTS server 614 via an Internet protocol (IP) network 622. In particular, base station A 620a is shown in electronic communication with the WALTS server 614 via IP network A 622a, base station B 620b is shown in electronic communication with the WALTS server 614 via IP network B 622b, and base station C 620c is shown in electronic communication with the WALTS server 614 via IP network C 622c.

In the system 600 that is shown in FIG. 6, the LLTS 602 may communicate directly with the WALTS 604. Thus, LLTS data that is determined by the LLTS 602 may be transmitted directly from the LLTS 602 to the database manager 618. FIG. 6 shows the LLTS 602 in electronic communication with the database manager 618 via an IP network 652. The LLTS 602 may transmit LLTS data to the database manager 618 via the IP network 652.

Figure 7:
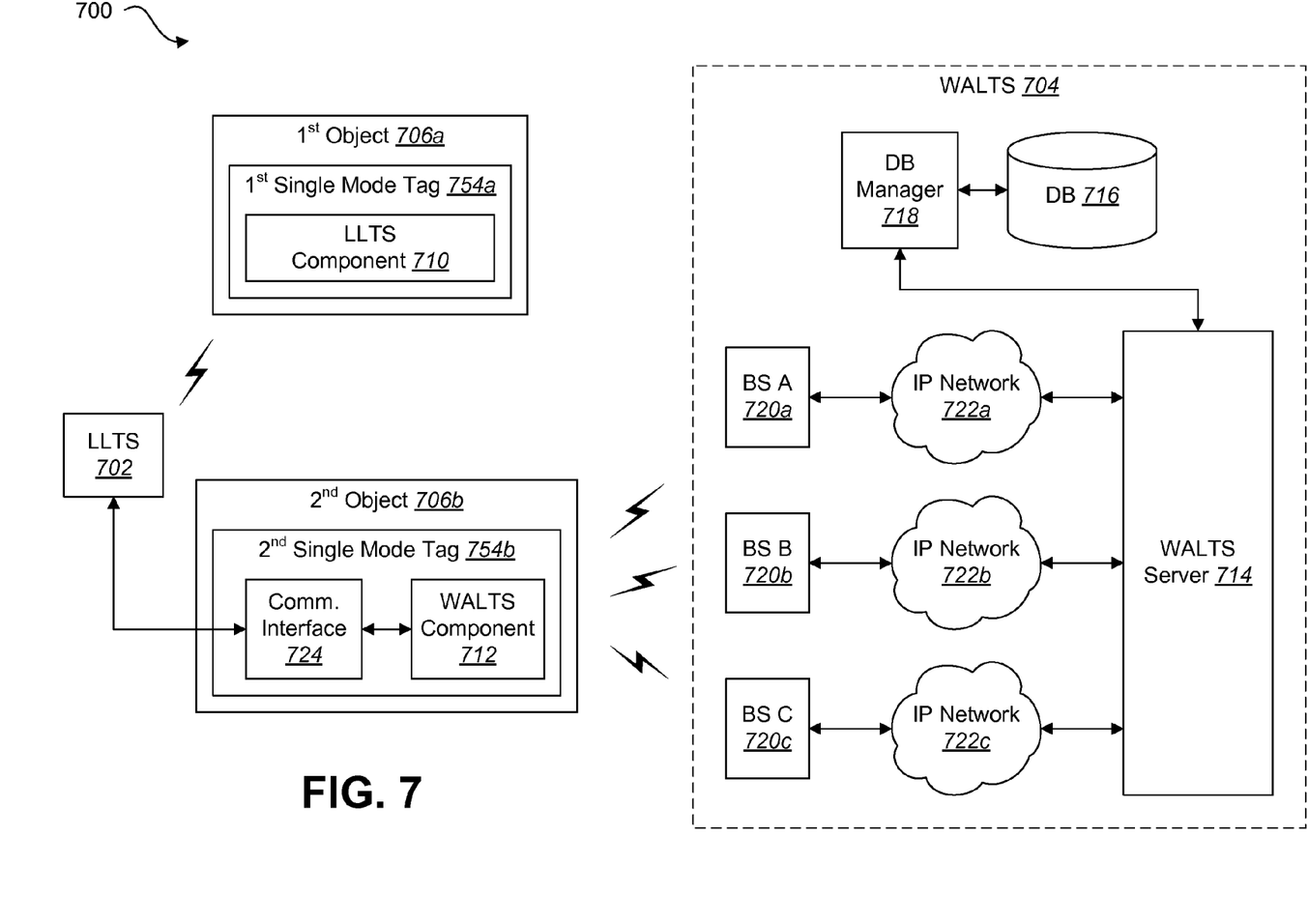
FIG. 7 illustrates an embodiment of a system for providing gateway functionality that allows objects to communicate with a WALTS.
Figure 8:
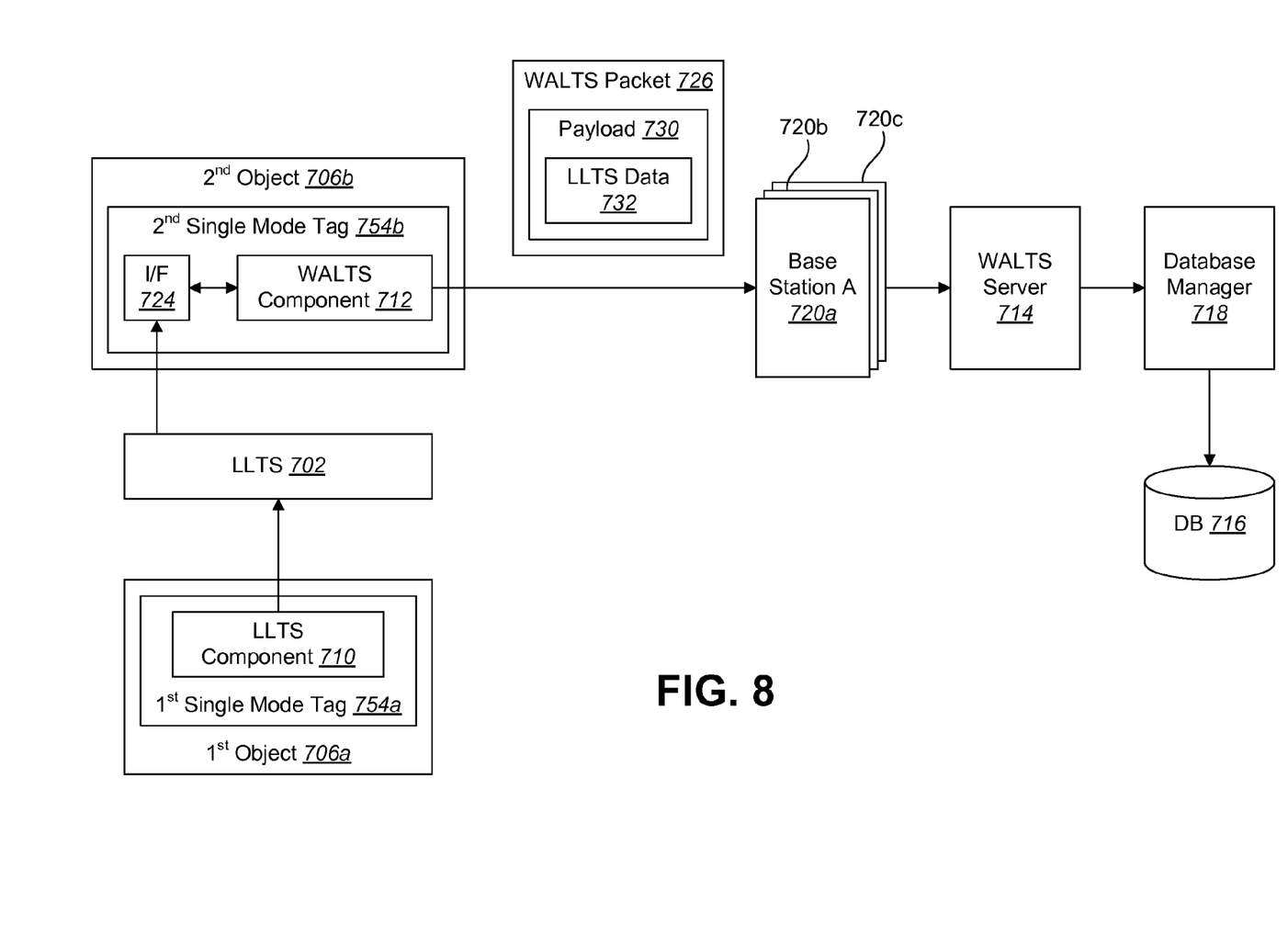
FIG. 8 illustrates how various components in the system of FIG. 7 may be configured to operate under some circumstances.

Another aspect of the present disclosure relates to providing gateway functionality that allows objects to communicate with a WALTS. Objects that make use of this gateway functionality may not otherwise be able to communicate with a WALTS. FIGS. 7 and 8 illustrate an embodiment of a system 700 for providing gateway functionality that allows objects to communicate with a WALTS 704.

Referring initially to FIG. 7, two objects 706 are shown, namely a first object 706a and a second object 706b. The first object 706a includes a first single mode tag 754a. The first single mode tag 754a includes an LLTS component 710. The LLTS component 710 allows an LLTS 702 to determine data about the first object 706a when the first object 706a is located within the coverage area of the LLTS 702. The data that is determined by the LLTS 702 will be referred to herein as LLTS data. The first single mode tag 754a is unable to communicate directly with the WALTS 104.

The second object 706b includes a second single mode tag 754b. The second single mode tag 754b includes a communication interface 724. When the LLTS 702 determines LLTS data about the first object 706a, the LLTS 702 may transmit the LLTS data to the second single mode tag 754b via the communication interface 724. The second single mode tag 754b also includes a WALTS component 712. When the second single mode tag 754b receives LLTS data about the first object 706a, the WALTS component 712 may transmit the LLTS data to the WALTS 704.

The WALTS 704 in the system 700 of FIG. 7 is similar to the WALTS 104 in the system 100 of FIGS. 1 through 4. In particular, the WALTS 704 includes a WALTS server 714, a database 716, and a database manager 718. The WALTS 704 also includes a plurality of base stations 720. Base station A 720a, base station B 720b, and base station C 720c are shown in FIG. 7. Each base station 720 is in electronic communication with the WALTS server 714 via an Internet protocol (IP) network 722. In particular, base station A 720a is shown in electronic communication with the WALTS server 714 via IP network A 722a, base station B 720b is shown in electronic communication with the WALTS server 714 via IP network B 722b, and base station C 720c is shown in electronic communication with the WALTS server 714 via IP network C 722c.

Referring now to FIG. 8, the WALTS component 712 may be configured to transmit a WALTS packet 726 that is received by one or more base stations 720 of the WALTS 704. FIG. 8 shows the WALTS packet 726 being received by base station A 720a, base station B 720b, and base station C 720c of the WALTS 704.

As mentioned, in the depicted embodiment the LLTS 702 is unable to communicate directly with the WALTS 704. The transmission of the WALTS packet 726 may provide a way for the LLTS data 732 that the LLTS 702 determines about the first object 706a to be communicated to the WALTS 704 and stored in the WALTS database 716. When the LLTS 702 determines LLTS data 732 about the first object 706a, the LLTS 702 may transmit the LLTS data 732 to the second single mode tag 754b via the communication interface 724. The LLTS data 732 may then be included in the payload 730 of the WALTS packet 726, as shown in FIG. 8. Each base station 720 that receives the WALTS packet 726 may forward the information in the WALTS packet 726, including the LLTS data 732, to the WALTS server 714. The WALTS server 714 may then forward the LLTS data 732 to the database manager 718, which may then store the LLTS data 732 in the database 716.

Like the WALTS component 712 that was discussed above, the WALTS component 712 that is shown in FIG. 7 may be configured to transmit a new WALTS packet 726 each time that a predetermined event occurs (e.g., on a periodic basis, each time that there is new data to transmit, etc.). The WALTS packets 726 that are transmitted by the WALTS component 712 may be transmitted in burst direct sequence spread spectrum radio signals.

Figure 9:
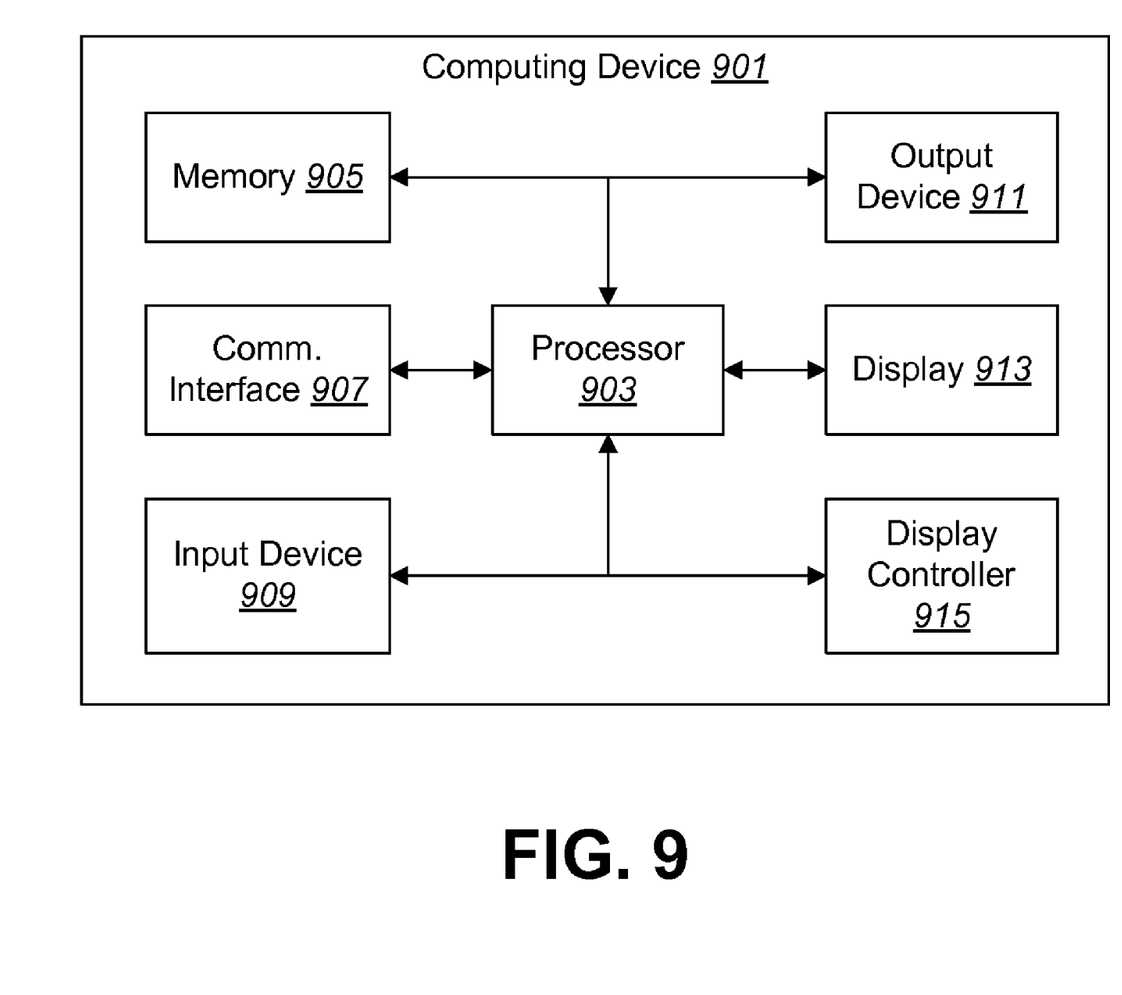
FIG. 9 illustrates components that may be utilized in a computing device.

FIG. 9 illustrates components that may be utilized in a computing device 901. Several of the components discussed above may be implemented using a computing device 901 or may include a computing device 901. Examples of such components include the LLTS, the WALTS, the multi-mode tags, the single mode tags, etc.

The computing device 901 may include a processor 903 and memory 905. The processor 903 may perform logical and arithmetic operations based on program instructions, or logical definitions, stored within the memory 905 or circuits contained within the processor 903. The memory 905 may include any electronic component capable of storing electronic information, and may be embodied as read only memory (ROM), random access memory (RAM), magnetic disk storage media, optical storage media, flash memory devices in RAM, on-board memory included with the processor 903, EPROM memory, EEPROM memory, registers, etc. The memory 905 may store program instructions and other types of data. The program instructions may be executed by the processor 903 to implement some or all of the methods disclosed herein.

The computing device 901 may include one or more communication interfaces 907 for communicating with other computing devices. The computing device 901 may also include one or more input devices 909 and one or more output devices 911. One specific type of output device which may be included in the computing device 901 is a display device 913. A display controller 915 may also be provided.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A multi-mode tag, comprising:
    a localized location and telemetry system hardware component that allows a localized location and telemetry system to determine localized location and telemetry system data about an object when the object is located within the coverage area of the localized location and telemetry system, wherein the localized location and telemetry system hardware component uses a communication protocol that is selected from the group consisting of active radio frequency identification, passive radio frequency identification, UltraWideband, ZigBee, Ultrasonic, and mesh networking; and
    a wide area location and telemetry system hardware component that allows a wide area location and telemetry system to determine wide area location and telemetry system data about the object when the object is located within the coverage area of the wide area location and telemetry system, wherein the wide area location and telemetry system hardware component is configured to transmit a wide area location and telemetry system packet using a burst direct sequence spread spectrum radio signal to be received by one or more base stations of the wide area location and telemetry system, wherein transmission of the wide area location and telemetry system packet facilitates determination of location data about the object based on timing information, wherein the timing information comprises a timestamp that indicates when the wide area location and telemetry system packet was received by the one or more base stations,
    wherein the localized location and telemetry system hardware component communicates using a different communication protocol than the wide area location and telemetry system hardware component, wherein the wide area location and telemetry system hardware component is different from the localized location and telemetry system hardware component.

2. The multi-mode tag of claim 1, wherein the multi-mode tag is configured to be coupled to the object.

3. The multi-mode tag of claim 2, wherein the localized location and telemetry system data comprises both location data and telemetry data about the object.

4. The multi-mode tag of claim 3, wherein the wide area location and telemetry system data comprises both location data and telemetry data about the object.

5. The multi-mode tag of claim 4, wherein the wide area location and telemetry system packet includes telemetry data about the object that is determined by the wide area location and telemetry system hardware component.

6. The multi-mode tag of claim 4, wherein the wide area location and telemetry system packet comprises localized location and telemetry system data that is received from the localized location and telemetry system.

7. The multi-mode tag of claim 1, wherein the wide area location and telemetry system packet comprises an indication about whether the localized location and telemetry system hardware component is connected to the localized location and telemetry system.

8. The multi-mode tag of claim 7, wherein the indication comprises an indicator positioned within a header portion of the wide area location and telemetry system packet and indicates whether the multi-mode tag is connected to the localized location and telemetry system.

9. A multi-mode tag, comprising:
    a localized location and telemetry system hardware component that allows a localized location and telemetry system to determine localized location and telemetry system data about an object when the object is located within the coverage area of the localized location and telemetry system, wherein communication between the localized location and telemetry system hardware component and the localized location and telemetry system uses a protocol that is selected from the group consisting of active radio frequency identification, passive radio frequency identification, Ultra-Wideband, ZigBee, Ultrasonic, and mesh networking; and
    a wide area location and telemetry system hardware component that allows a wide area location and telemetry system to determine wide area location and telemetry system data about the object when the object is located within the coverage area of the wide area location and telemetry system, wherein communication between the wide-area location and telemetry system hardware component and the wide-area location and telemetry system uses a burst-mode direct sequence spread spectrum (DSSS) signaling protocol that is different than the protocol that is selected for the localized location and telemetry system hardware component, wherein the wide area location and telemetry system hardware component is configured to transmit a wide area location and telemetry system packet to be received by one or more base stations of the wide area location and telemetry system, wherein transmission of the wide area location and telemetry system packet facilitates determination of location data about the object based on timing information, wherein the timing information comprises a timestamp that indicates when the wide area location and telemetry system packet was received by the one or more base stations, wherein the wide area location and telemetry system hardware component is different from the localized location and telemetry system hardware component, and wherein the wide area location and telemetry system packet comprises an indicator positioned within a header portion of the wide area location and telemetry system packet that indicates whether the localized location and telemetry system hardware component is connected to the localized location and telemetry system.

10. A communication system, comprising:

a localized location and telemetry system that determines localized location and telemetry system data about an object with an attached multi-mode tag when the object is located within the coverage area of the localized location and telemetry system; and a wide area location and telemetry system that determines wide area location and telemetry system data about the object when the object is located within the coverage area of the wide area location and telemetry system, wherein the wide area location and telemetry system comprises a plurality of base stations, wherein the wide area location and telemetry system is configured to determine location data about the object based on timing information that is provided by at least one of the plurality of base stations, and wherein the timing information comprises a timestamp that indicates when the wide area location and telemetry system packet was received by the base station, wherein the localized location and telemetry system communicates with the wide area location and telemetry system using a first protocol, wherein the localized location and telemetry system communicates with the object using a second protocol, wherein the second protocol is selected from the group consisting of active radio frequency identification, passive radio frequency identification, UltraWideband, ZigBee, Ultrasonic, and mesh networking, wherein the wide area location and telemetry system communicates with the object using a third protocol, wherein the third protocol comprises burst direct sequence spread spectrum radio signals, wherein the first protocol is different than the second and third protocols and the second protocol is different than the third protocol, wherein the object comprises a wide area location and telemetry system hardware component and a localized location and telemetry system hardware component, and wherein the wide area location and telemetry system hardware component is different from the localized location and telemetry system hardware component.

* * * * *